Aug. 5, 1941.   A. P. FOREE ET AL   2,251,624
PLANT BED PROTECTOR EQUIPMENT
Filed Dec. 14, 1938
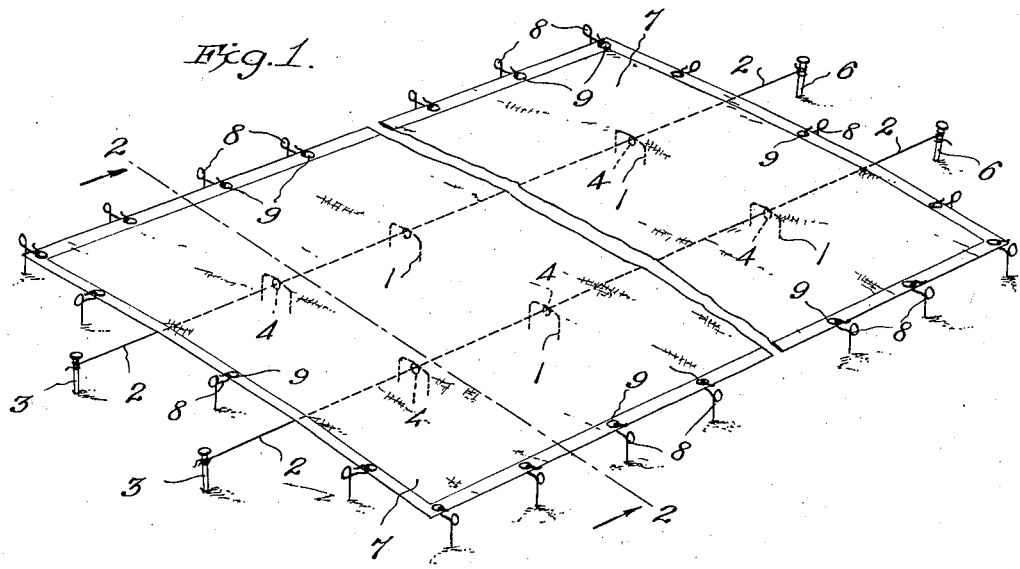
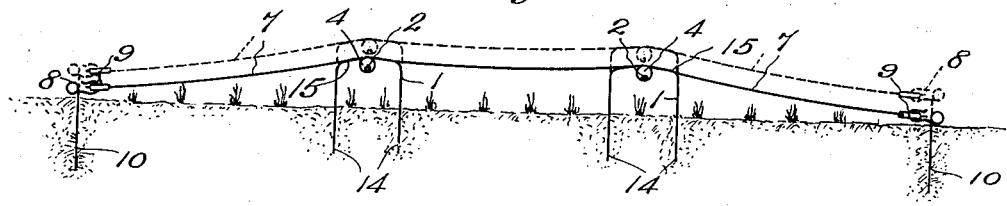
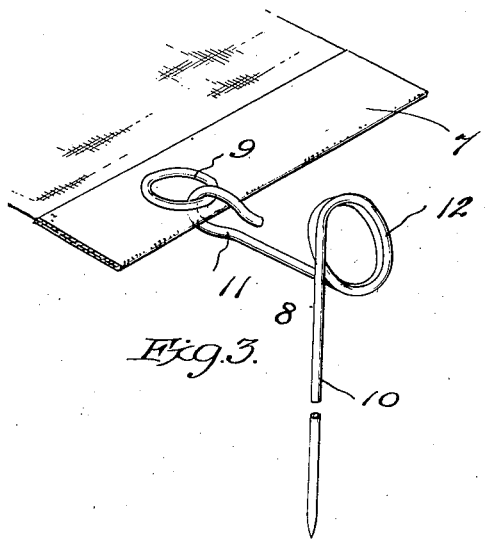
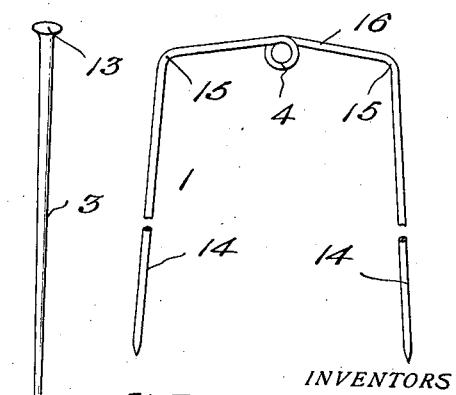
INVENTORS
ALFRED P. FOREE
JOHN M. FOREE
BY Geo. A. Byrne ATTORNEY Patented Aug. 5, 1941

2,251,624

UNITED STATES PATENT OFFICE 2,251,624

PLANT BED PROTECTOR EQUIPMENT

Alfred P. Foree and John M. Foree, Campbellsburg, Ky., assignors of one-third to Gray O. Strother, Glen Ridge, N. J.

Application December 14, 1938, Serial No. 245,602

2 Claims. (Cl. 47—28)

The present invention relates to a plant bed protector equipment, and, more particularly, to a plant bed protector set for preparing, shielding and sheltering tobacco plant beds from the first planting of the tobacco plants to the time of their maturity and transplanting.

It is an object of the present invention to provide a plant bed protector set which eliminates the disadvantages and inconveniences of conventional protector equipment and procedure.

It is another object of the present invention to provide a plant bed protector set of novel and improved character which dispenses with the conventional wooden stobs and which provides simple, inexpensive and standardized metallic fastening members of an adjustable character.

It is a further object of the invention to provide metallic fastening elements formed of suitably shaped wire, including wickets, anchoring members and hooks which are capable of being used year after year, are of a readily adjustable character and are capable of securely holding the canvas in a readily removable position without causing any undue wear and tear on the protective sheet or canvas.

The invention also contemplates a plant bed protector set which is extremely simple in construction and which may be manufactured and employed on a practical scale at a very low cost.

Other and further objects and advantages will become apparent from the following description taken in conjunction with the accompanying drawing, in which Fig. 1 illustrates a perspective view, somewhat diagrammatic in character, of a plant bed covering set embodying the principles of the present invention;

Fig. 2 depicts a cross sectional view taken on line 2—2 of Fig. 1 and showing the covering adjusted to various different positions;

Fig. 3 shows a perspective view of a canvas hook with a portion of the canvas;

Fig. 4 shows a similar view of one of the anchors for securing the ends of a supporting wire; and Fig. 5 is a view of one of the wickets embodying the invention and forming a support for the intermediate portions of the wire and for the corresponding inner portions of the canvas.

Referring now more particularly to Fig. 1 of the drawing, a preferred embodiment of the invention is illustrated in perspective. The protective structure essentially comprises a plurality of wickets 1 placed in two rows at suitable intervals, such as, for example, 12 feet. Due to their greater spread at the bottom than at the shoulders and due to their resilient character, a lateral pressure against the ground is maintained at all times which allows for adjustments in depth. As a result of this construction, the wickets are securely maintained in any position regardless of whether they are pressed in almost completely when the seeds are first planted or are raised to their extreme height when the plants are of a size ready for transplanting. A supporting wire 2 of suitable dimensions and strength is fastened at one end to an anchor 3, threaded through eyelets 4 beneath the top crossbars of wickets 1 in a row and is fastened to another anchor 6 at the other end of the bed. A second wire is passed through the eyelets of the other row of wickets and is anchored in the same manner.

Over the entire area is spread a canvas 7 of a sufficient width and length. Canvas hooks 8 of a suitable number, for example 148, are pressed into the ground the entire distance between the point and the bottom of the spiral, and eyelets 9 of the canvas are hooked onto them. Thus, the canvas is securely anchored throughout the circumference thereof and forms a strong, stable and inexpensive protective covering which can be put up and removed or adjusted with a minimum of trouble and within a very short time.

When weeding is necessary, supporting wire 2 is loosened at one end and is allowed to lie slack. In this position of the wire, the canvas may be rolled back and a weeding board may be laid on the slacked wire without damaging the same or the other parts of the protector structure. As there is some yielding or resiliency in the canvas, the eyelets thereof can be readily withdrawn from the canvas hooks without requiring displacement or complete removal of the canvas hooks. After weeding is completed, the wickets and canvas hooks may be slightly raised and adjusted in accordance with the growth of the plants, prior to again anchoring and tensioning the supporting wire. Due to their resilient character, the wickets maintain the desired height at which they are set. This will be best observed in Fig. 2 in which a higher position of the protector structure is indicated in broken lines.

The structure of the canvas hooks embodying the invention will be best understood from Fig. 3. The canvas hook is preferably made of a strong and resilient wire bent to such a shape as to have a pointed vertical portion 10 and a hook-shaped horizontal portion 11 connected with each other by means of a coil-shaped intermediate portion 12. All three portions are integrally formed of a single piece of wire. Due to the presence of the intermediate portion of coiled or spiral character, substantial resiliency is imparted to the hook-shaped portion so that it can be resiliently displaced during the time when it is desired to insert the hook into or to remove the same from eyelet 9 of canvas 7.

Fig. 4 illustrates an anchor of the type employed in the protector structure of the present invention. The anchor comprises a rod 3 of tapering character constituted of a material having strength and at least some resiliency. The lower end of the anchor is pointed, and the upper end thereof is provided with a knob-like enlargement 13 to which the end of a running wire may be securely attached. Instead of a knob, it is also possible to provide an eye in the upper portion of the anchoring element with equal or similar results.

Fig. 5 depicts one of the wickets employed in the novel plant protector structure of the invention. The wicket is integrally formed of a single piece of resilient wire to form an inverted U-shaped structure, having legs 14 with pointed ends, shoulders 15 and a slightly arched horizontal or connecting portion 16. A downwardly directed loop or eyelet 4 is formed between the shoulders imparting resiliency to the legs and forming a supporting element for the running wire. Due to the downwardly directed character of the eyelet, injury to the canvas is prevented and at the same time the arched connecting portion provides strong and resilient support for the portion of the canvas resting thereon. As it has been set forth in the foregoing, the wicket has a spread several inches wider at the bottom than at the shoulders thereby exerting an outwardly directed pressure to legs 14 whereby the wicket is securely maintained in any adjusted position.

Although the present invention has been described in connection with a preferred embodiment thereof, variations and modifications may be resorted to by those skilled in the art without departing from the principles of the present invention. We consider all of these variations and modifications as within the true spirit and scope of the present invention as disclosed in the foregoing description and defined in the appended claims.

We claim:

1. In a plant bed protector structure comprising a series of relatively spaced parallel wires, means anchoring the ends of the wires to the ground, members supporting the major portions of the wires above the ground, said members extending laterally beyond the wires, a sheet resting upon the wires and upon the projecting portions of said members, and members for exerting an outward pull in all directions on the sheet, said last members consisting of rods anchored in the ground at the edges of the sheet, and hooks mounted on the rods and detachably connected to the edges of the sheet.

2. In a plant bed protector structure comprising a series of relatively spaced parallel wires, means anchoring the ends of the wires to the ground, members supporting the major portions of the wires above the ground, said members extending laterally beyond the wires, a sheet resting upon the wires and upon the projecting portions of said members, and members for exerting an outward pull in all directions on the sheet, said last named members consisting of rods anchored in the ground, spring loops at the upper ends of the rods and hooks carried by the spring loops and detachably engaged with the edges of the sheet.

ALFRED P. FOREE.
JOHN M. FOREE.